United States Patent [19]
Goellner

[11] Patent Number: 5,544,968
[45] Date of Patent: Aug. 13, 1996

[54] LOCKABLE BALL JOINT APPARATUS

[75] Inventor: Willy J. Goellner, Rockford, Ill.

[73] Assignee: Advanced Machine & Engineering Co., Rockford, Ill.

[21] Appl. No.: 460,047

[22] Filed: Jun. 2, 1995

[51] Int. Cl.[6] .................. F16D 1/12; F16D 3/80; F16C 11/00; F16M 11/20
[52] U.S. Cl. .................. 403/31; 403/90; 403/122; 403/144; 248/181.1; 248/288.51; 248/288.31
[58] Field of Search .................. 403/31, 37, 38, 403/39, 76, 83, 84, 90, 122, 136, 137, 138, 141, 142, 143, 144; 248/181.1, 181.2, 288.31, 288.51

[56] References Cited

U.S. PATENT DOCUMENTS

| | | |
|---|---|---|
| 2,559,925 | 7/1951 | Barker . |
| 3,470,793 | 10/1969 | Hanchen . |
| 3,519,236 | 8/1967 | Schmidt et al. .................. 403/90 X |
| 3,995,534 | 12/1976 | Rastetter . |
| 4,088,312 | 5/1978 | Frosch et al. . |
| 4,447,139 | 5/1984 | Biber .................. 403/90 X |
| 4,527,783 | 7/1985 | Collora et al. . |
| 4,684,113 | 8/1987 | Douglas et al. . |
| 4,834,519 | 5/1989 | Twisselmann .................. 403/90 X |
| 4,974,802 | 12/1990 | Hendren .................. 403/90 X |
| 5,302,062 | 4/1994 | Baba et al. . |
| 5,314,174 | 5/1994 | Hagman . |

Primary Examiner—Blair Johnson
Assistant Examiner—Bruce A. Lev
Attorney, Agent, or Firm—Vernon J. Pillote

[57] ABSTRACT

A lockable ball joint apparatus including a ball and a ball receiving cavity and at least one annular clamp ring in the casing extending around the ball. The clamp ring has a spherically concave inner clamping surface engaging the outer surface of the ball and a frusto-conical outer surface. An annular cam extends around the clamp ring and has a frusto-conical inner surface engaging the frusto-conical outer surface of the clamp ring. The annular cam is formed on an annular piston and springs are provided for moving the annular piston and cam axially in a first direction to diametrically compress the clamp ring into clamping engagement with the ball, and fluid pressure is applied to the annular piston for moving the annular cam means axially in a second direction to release the clamp ring from clamping engagement with the ball.

15 Claims, 4 Drawing Sheets

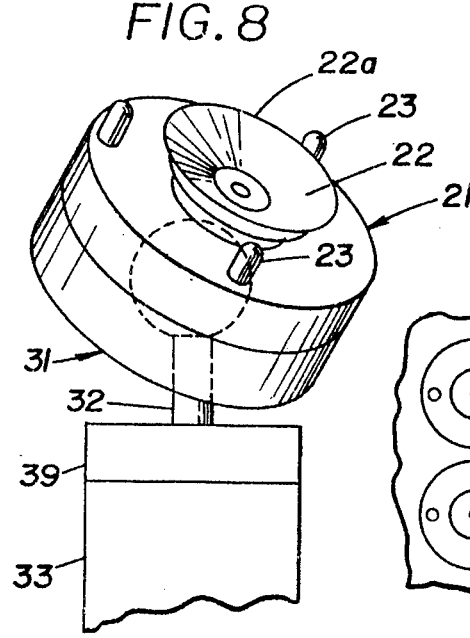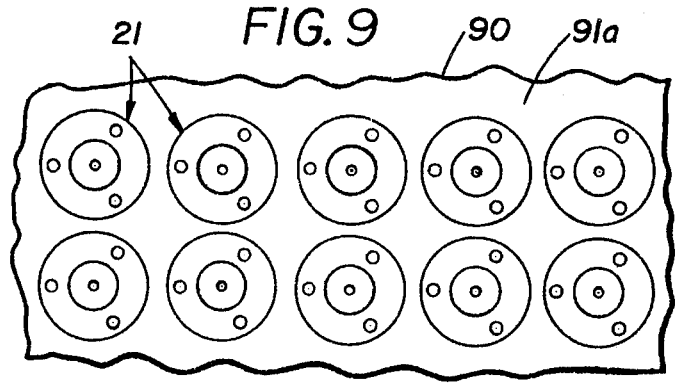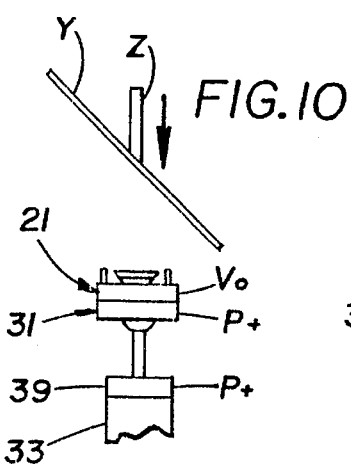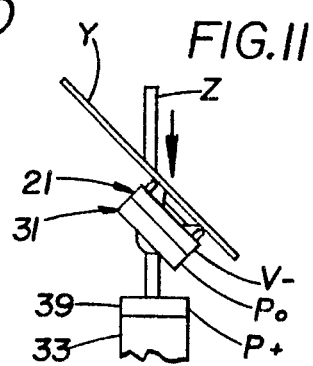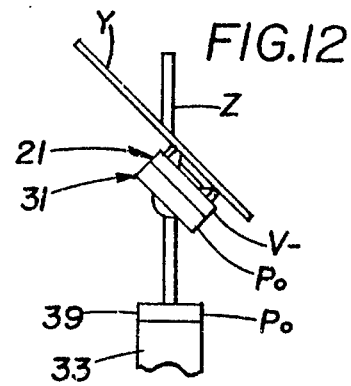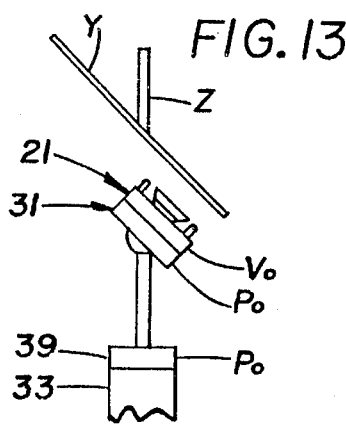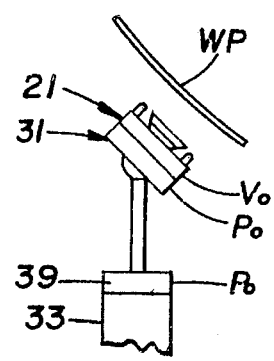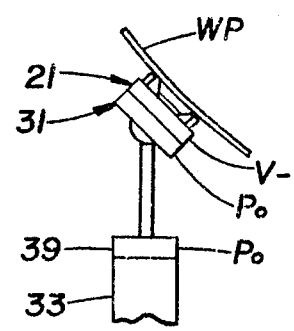

LOCKABLE BALL JOINT APPARATUS

RELATED APPLICATIONS

This application is related to an application of Willy J Goellner entitled "Universal Holding System For A Contoured Workpiece", filed Jun. 2, 1995, Ser. No. 08/460,048.

BACKGROUND OF THE INVENTION

U. S. Pat. Nos. 3,470,793; 3,995,534 and 5,302,062 disclose devices for clamping an axially movable rod having spring arrangements for normally urging the rod clamps to one condition and fluid pressure operated means for moving the rod clamps to a second condition. U.S. Pat. Nos. 2,559,925 and 5,314,174 disclose ball joint devices having a ball clamp piston mounted for movement radially of the ball to frictionally hold the ball against movement relative to the socket, with spring means for actuating a piston to one condition and fluid pressure operated means for moving the piston to a second condition. In such ball joint devices, the frictional holding force of the ball clamp piston on the ball is limited by the pressure available for actuating the piston, and difficulties are encountered in installations where the fluid pressure available for actuating the ball clamp piston is low.

SUMMARY OF THE INVENTION

In accordance with the present invention, there is provided a lockable ball joint apparatus having an improved arrangement for locking the ball joint in adjusted positions. The ball joint includes a casing having ball receiving cavity and at least one annular clamp ring in the casing extending around the ball, the clamp ring having a spherically concave inner clamping surface engaging the outer surface of the ball and a frusto-cohical outer surface. An annular cam means in the casing extends around the clamp ring and has a frusto-conical inner surface engaging the frusto-conical outer surface of the clamp ring, and means are provided for moving the annular cam means axially in a first direction relative to the casing to diametrically compress the clamp ring into clamping engagement with the ball, and means are provided for moving the annular cam means axially in a second direction relative to the casing to release the clamp ring from clamping engagement with the ball.

Annular piston means are advantageously provided for fluid pressure actuation of the cam means in either or both directions. The annular cam means may advantageously be spring actuated in a direction to diametrically compress the clamp ring to normally lock the ball joint against movement, with piston means arranged for actuation by fluid pressure to a release condition. Since the axial forces applied to the annular cam ring are effectively amplified by the cam action, the annular cam means applies a substantially greater radial clamping force on the clamp ring. Thus, the ball joint can be reliably locked in any adjusted position without requiring high forces to move the annular cam means.

The lockable ball joint apparatus is herein shown applied to a work holder apparatus in which a work engaging head is supported by the ball joint on a rod mounted for axial movement relative to a base, and the ball joint supports the work engaging head for tilting movement about axes orthogonal to each other and to the axis of movement of the rod. With this arrangement, the work engaging head can be tilted relative to the rod about axes orthogonal to each other and to the axis of movement of the rod, and the ball joint then locked to hold the head in the desired position.

BRIEF DESCRIPTION OF THE DRAWINGS

FIG. 8 is a fragmentary view illustrating the work holding head in a tilted work support position;

FIG. 9 is a fragmentary top plan view of a universal holding system having an array of work holding fixtures in accordance with the present invention;

FIGS. 10–15 are diagrammatic views illustrating a method for adjusting the work holders.

DETAILED DESCRIPTION

Figure 1:
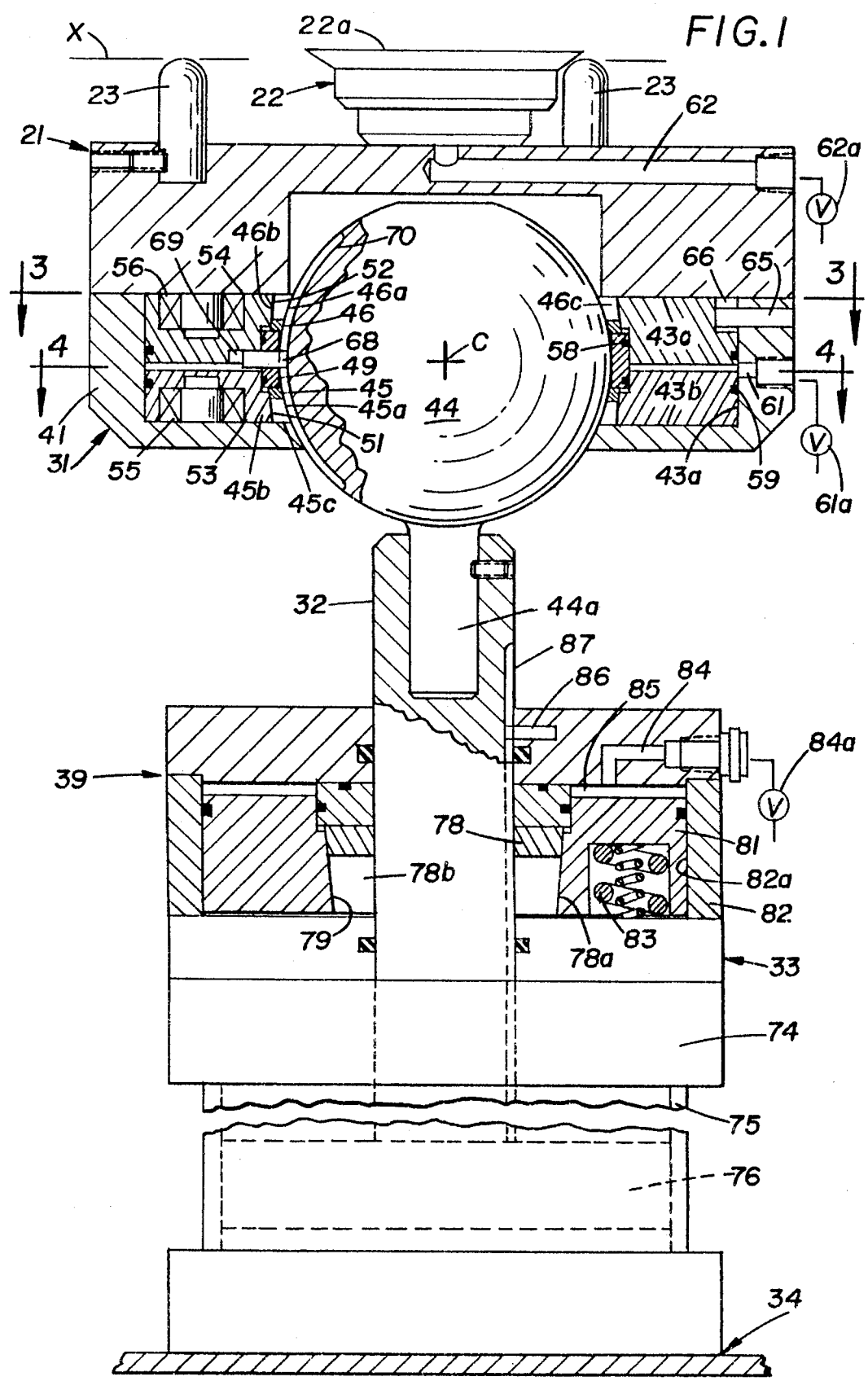
FIG. 1 is a vertical sectional view through a work holding fixture using the lockable ball joint of the present invention.
Figure 2:
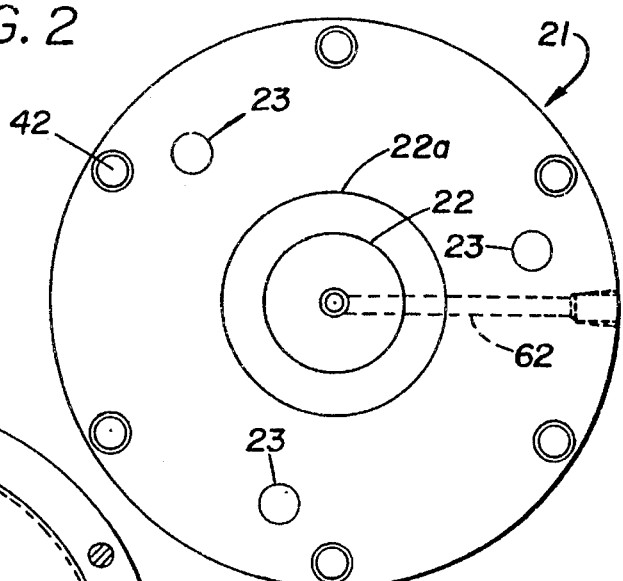
FIG. 2 is a top view of the work holding fixture.
Figure 3:
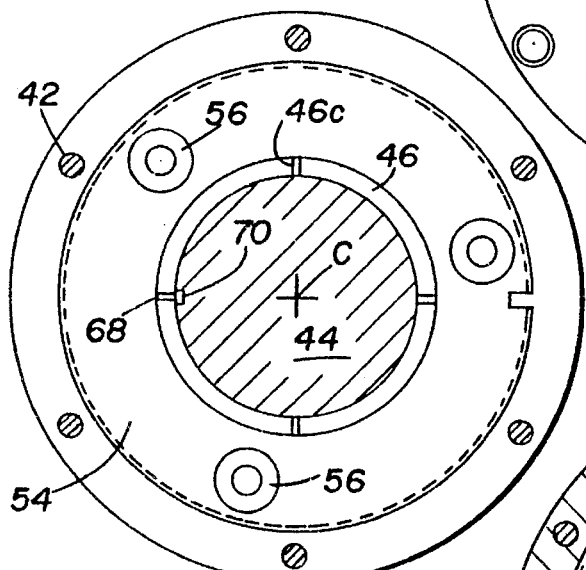
FIG. 3 is a transverse sectional view taken on the plane 3—3 of FIG. 1.
Figure 4:
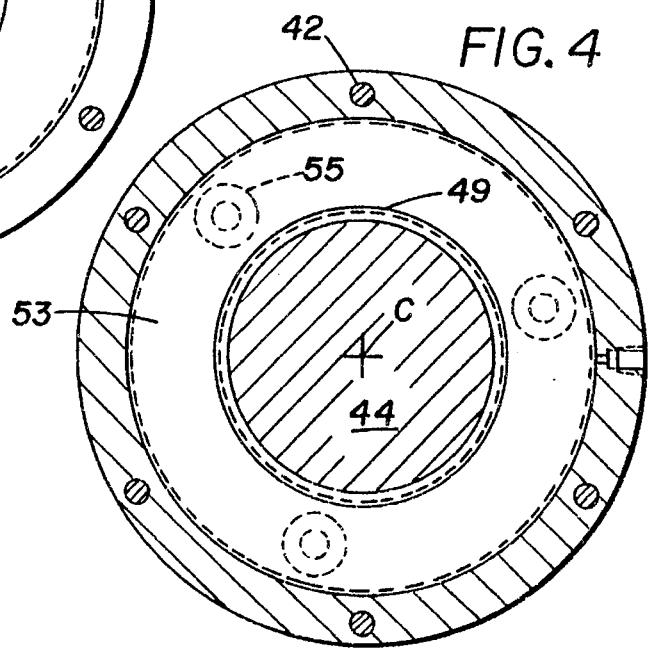
FIG. 4 is a transverse sectional view taken on the plane 4—4 of FIG. 1.

FIGS. 1–4 illustrate a work holding fixture adapted for use in a universal holding system for supporting a large workpiece having a contoured work holding surface. The work holding fixture includes a work engaging head 21 having vacuum cup means 22 with a resilient peripheral work contacting rim 22a and three rigid work engaging projections 23 spaced outwardly from the vacuum cup means and disposed in a plane X generally parallel to a plane through the peripheral work contacting rim of the vacuum cup. The plane X is preferably disposed slightly below the plane through the peripheral rim of the vacuum cup, to assure that the vacuum cup reliably contacts a work engaging surface on the workpiece and the vacuum cup is made sufficiently resilient and flexible to deform to accommodate workpieces having a downwardly facing convex contour when the workpiece is supported on the work engaging projections. The projections 23 are preferably located equidistant from the center of the vacuum cup 22.

The work engaging head 21 is mounted by a ball and socket joint 31 on a spindle or rod 32 that is mounted by means 33 for axial movement relative to a base 34. The ball and socket joint 31 supports the work engaging head for tilting or angular movement about axes orthogonal to the axis of the rod, and clamp means are provided locking the ball and socket joint in angularly adjusted positions. The rod mounting means 33 guidably supports the rod for axial movement and rod clamp means 39 are provided on the mounting means 33 for locking the rod 32 in axially adjusted positions.

The ball joint means includes a ball means 44 and ball casing means 41 defining a ball receiving cavity. In the preferred embodiment illustrated in FIGS. 1–4, the ball casing means 41 is fixed to and forms a part of the work engaging head 21 as by fasteners 42, and the ball 44 has a stem 44a attached to the rod 32. It is deemed apparent that the ball casing means could be attached to the rod 32 and the ball 44 attached to a work engaging head, if desired.

The ball receiving cavity has a cylindrical outer wall 43a and annular end walls 43b and 43c. In the embodiment of FIGS. 1–4, a pair of clamp rings 45 and 46 extend around the ball 44 and each having a spherically concave inner surface 45a, 46a respectively and a frustoconical outer surface 45b, 46b respectively. The clamp rings 45 and 46 are disposed at opposite sides of a plane through the center C of the ball 44 and a seal ring 49 is disposed between adjacent ends of the clamp rings. The outer ends of the clamp rings engage the walls 43b and 43c respectively and the inner ends of the clamp rings engage opposite ends of the seal ring so that the clamp rings are confined against movement in a direction axially of the rings while the clamp rings are capable of radially expanding and contracting. The clamp rings 45 and 46 are preferably radially slotted part way through their length, from one or both ends as indicated at 45c, 46c, to facilitate radial expansion and contraction.

The frusto-conical outer surfaces 45b and 46b are arranged so that they taper inwardly in a direction away from a plane through the center of the ball, and first and second annular cam means 51 and 52 are formed with a frusto-conical inner surface complimentary to the frustoconical outer surface of the clamp rings 45 and 46 respectively. The annular cam means are mounted for limited axial movement relative to the clamp rings to move the latter into clamping engagement with the ball when the cam means is moved in one axial direction and to release the clamp rings from the clamping engagement with the ball when the cam means is moved in the opposite direction. Annular piston means 53 and 54 are provided for fluid pressure actuation of the cam means in at least one direction and it is contemplated that the piston means may be arranged for selectively actuating the cam means in both directions. The annular cam means 51 and 52 are advantageously formed on the inner periphery of the annular pistons 53 and 54. In the preferred embodiment illustrated in FIGS. 1–4, a plurality of compression springs 55 and 56 are disposed between the pistons 53 and 54 and the adjacent end walls 43b, 43c of the cavity, and arranged to yieldably urge the pistons and hence the annular cam means 51 and 52 in a direction to radially compress the clamp rings and lock the work engaging head in an angularly adjusted position on the ball. It is deemed apparent that the pistons could be arranged to enable fluid pressure actuation of the cam means in either or selectively in both directions to clamp or release the ball. Resilient seals 58 and 59 are provided for sealing the pistons to the seal ring 49 and to the outer wall 43a of the cavity. A passage 61 is provided in the casing 41 and arranged to communicate with a chamber between adjacent faces of the pistons, to supply an exhaust fluid pressure under the control of valve means diagrammatically shown at 61a in FIG. 1. As is deemed apparent, the fluid may be either gas or liquid, but in some applications gas such as air is preferred to prevent contamination in the event of leakage. A passage 62 is provided in head 21 for communicating the vacuum cup 22 with a vacuum source under the control of valve means diagrammatically shown at 62a in FIG. 1.

The ball joint supports the head for tilting movement about the center of the ball about axes orthogonal to the axis of the rod 32 and in the embodiment illustrated is adapted to allow the head to tilt to an angle of up to at least 45 degrees in any direction from a plane perpendicular to the axis of the rod. In some installations it is preferable to prevent turning of the head about the axis of the rod. As shown in FIG. 1, a pin 65 on the casing 41 extends into a notch 66 in one of the pistons 54 to hold the piston against turning relative to the casing. A pin 68 on the seal ring 49 has one end that extends into a notch 69 in the piston 54 and a second end that extends into a groove 70 in the periphery of the ball. The pin 68 is disposed with its axis in a plane through the center of the ball and perpendicular to the axis of the rod 32 and prevents the seal ring from turning relative to the piston 54. The groove 70 is disposed in a plane that extends radially of the axis of the rod so that the pin 48 prevents rotation of the head relative to the ball about the axis of the rod while accommodating tilting movement along axes orthogonal to the axis of the rod.

The rod 32 is axially adjustable relative to the base 34 to enable adjustment of the spacing of the head relative to the base and the rod clamp means 39 is provided for locking the rod and hence the head in an adjusted position relative to the base. Any suitable means may be provided for guidably supporting and locking the rod in an adjusted position. In the embodiment shown in FIG. 1, the rod mounting means 33 includes a head 74 on an upper end of a cylinder 75 and a piston 76 fixed to a lower end of the rod and slidable in the cylinder. The rod clamp 39 includes an annular clamp ring 78 having a cylindrical inner surface that extends around the rod and a frustoconical outer surface 78a and slots 78b that extend part way through the ring to facilitate radial expansion and contraction. The rod clamp also includes an annular cam means 79 having a tapered inner surface complimentary to the outer surface of the clamp ring. The annular cam means 79 is formed on the inner surface of an annular piston 81 slidable on the inner surface 82a of a clamp actuator casing 82. The piston is yieldably urged in one direction as by springs 83 and is moved in an opposite direction by fluid pressure introduced through a passage 84 into a pressure chamber 85. The rod clamp is preferably of the type that is actuated to its clamped condition by springs 83 and operated to its release condition by fluid pressure applied to the piston chamber 85 under the control of a valve 84a diagrammatically shown in FIG. 1. In order to prevent turning of the work engaging head about the axis of the rod, a pin 86 is mounted on the casing and projects into a longitudinally extending groove 87 in the rod.

Figure 5:
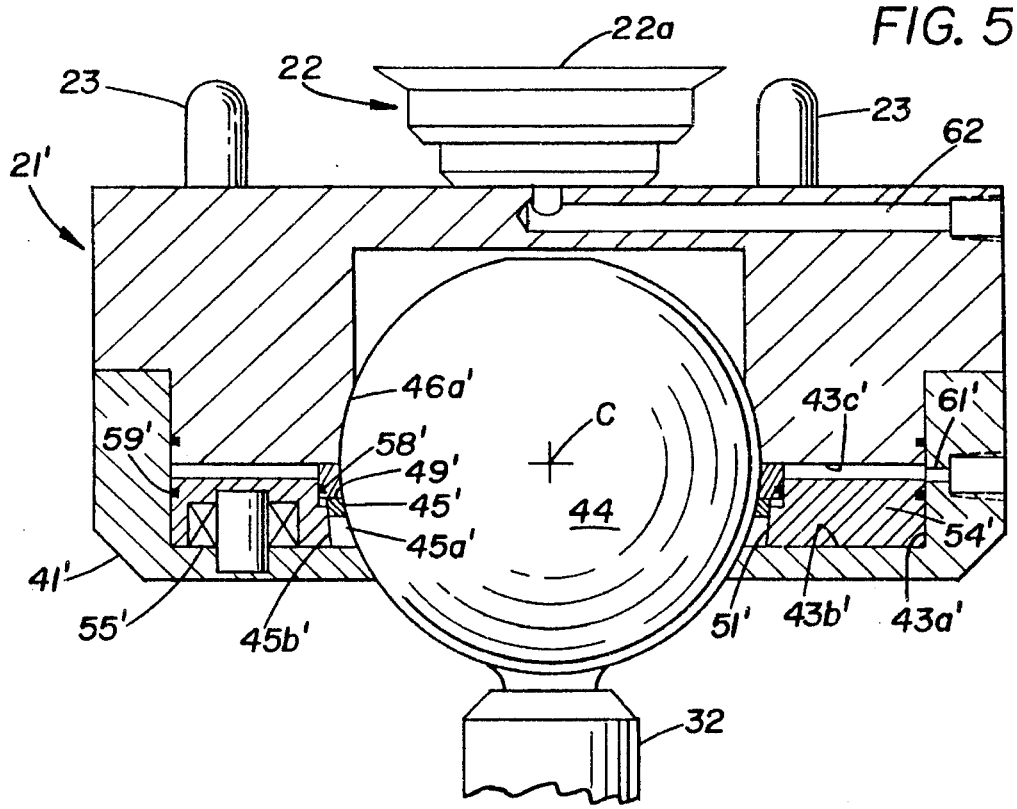
FIG. 5 is a fragmentary vertical sectional view through a second embodiment of the work holding fixture having a modified form of ball clamp.

FIG. 5 illustrates a modified ball and socket joint for mounting the work engaging head 21 for angular adjustment relative to the rod 32. Like numerals are used to designate the same parts as in FIG. 1 and like numerals followed by the postscript (') are used to designate modified parts. In this embodiment, a ball receiving casing means 41' has a cavity with cylindrical peripheral wall 43a' and end walls 43b' and 43c'. A single clamp ring 45' is provided with a spherically concave inner surface 45a' and a frusto-conical outer surface 45b'. An annular cam means 51' extends around the clamp ring and has a frusto-conical surface complimentary to the outer surface of the clamp ring. An annular piston 55' is provided to enable fluid pressure actuation of the annular cam means 51' in at least one direction and the cam means is preferably formed integrally with an annular piston. In the embodiment of FIG. 5, the clamp ring is disposed below a plane through the center C of the ball 44 when the head is in a horizontal position. The spherically concave inner surface of the clamp ring has a major inner diameter at its upper end and the frusto-conical outer surface has a major outer diameter at the same end as the major inner diameter of the clamp ring. Seals such as 59' and 58' seal the piston to the outer wall 43a' of the casing and to a seal ring 49'. Means such as springs 55' are provided for yieldably urging the piston and the annular cam means in one direction, preferably in a direction to cam the clamp ring into clamping engagement with the ball, and passage means 61' are provided for supplying fluid pressure to a chamber formed between the piston and the wall 43c' to move the cam means in an opposite direction. In this embodiment, a spherically concave inner surface 46a' is provided and arranged to engage the ball at a side opposite the clamp ring 45'. This arrangement provides firm support for the work engaging head when the latter is subjected to heavy loads in a downward direction, that is toward the rod 32.

Figure 6:
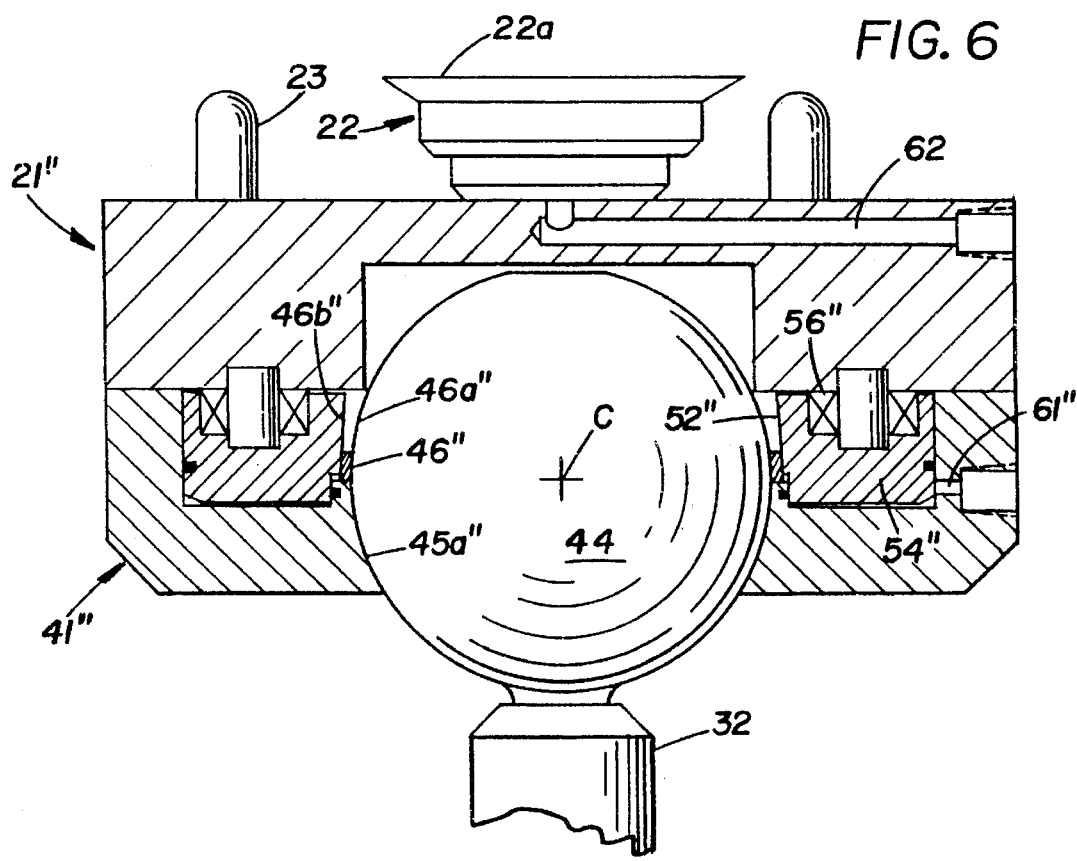
FIG. 6 is a fragmentary vertical sectional view through a third embodiment of the work holding fixture having a modified ball clamp.

In the embodiment of FIG. 6, the ball clamp comprises a single clamp ring 46" arranged to engage the ball 44 at a location that is above a plane through the center C of the ball when the head is in a horizontal position, and a spherically concave surface 46a" on the casing 41" is arranged to engage the ball at a location below a plane through the center of the ball when the head is in a horizontal position. The clamp ring 46" has a spherically concave inner surface 46a" and a frusto-conical outer surface 46b". An annular piston 54" is provided to enable fluid pressure actuation of the cam means and annular cam means 52" is advantageously formed on the annular piston 54". The annular piston may be arranged to enable fluid pressure actuation of the cam means in either or both directions. In the embodiment illustrated in FIG. 6, spring means 56" are provided to yieldably urge the piston in a downward direction and fluid is supplied to the head of the piston through a passage 61" to move the piston in an upward direction in opposition to the springs 56".

Figure 7:
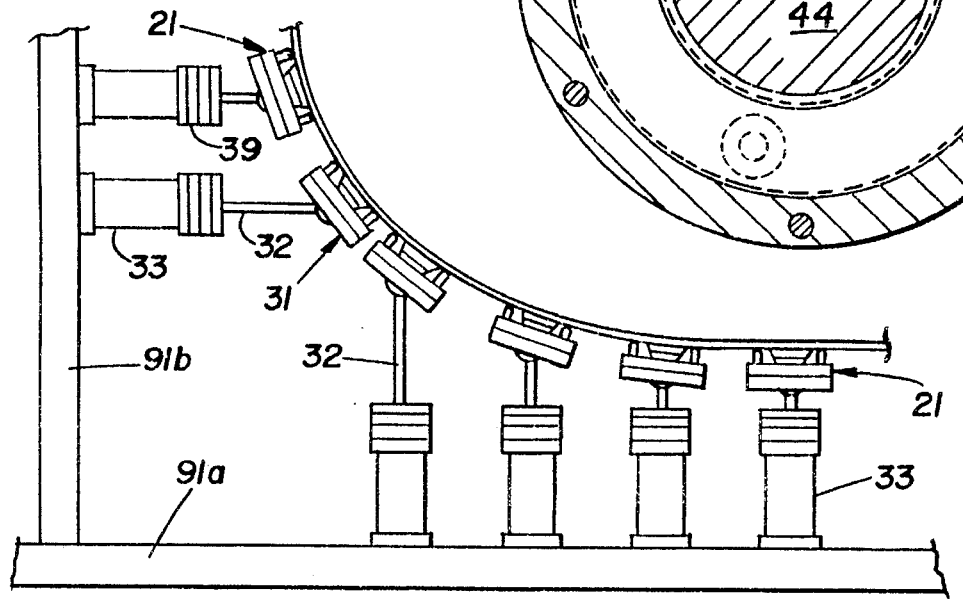
FIG. 7 is a vertical sectional view through an array of work holding fixtures arranged to support a workpiece having a contour varying from horizontal to vertical.

The work holder is especially adapted for use in a universal work holding system for supporting and holding a large workpiece having a contoured holding surface. In general, such universal holding systems include a spaced array of work holding fixtures mounted on a platform or bed 90 having indexing or locating bores or grooves such as the work table of a machine tool. The work table of a machine tool is commonly horizontal such as indicated at 91a but the work holder is also adapted for mounting on beds having supports disposed at an angle such as perpendicular to the horizontal as indicated at 91b in FIG. 7. The work holding heads 21 of the present invention are advantageously arranged such that they can be adjusted through an angle of at least 45 degrees in any direction relative to the rods 32. Thus, the work holders can be mounted on a horizontal surface to support workpieces having a work engaging face that deviates between zero and forty-five degrees, and mounted on a vertical surface to accommodate portions of the workpiece that extend at an angle of greater than forty-five degrees to the horizontal, as shown in FIG. 7.

FIGS. 10–15 illustrate a method for presetting individual work holders in an array to support a large workpiece having a contoured work holding surface. As shown in FIG. 10, an adjustable plate Y is first adjusted to extend at a preselected angle relative to a vertically movable support Z, which angle corresponds to the desired support plane at the preselected locus in the array. In step 1 shown in FIG. 10, vacuum to the vacuum cup is turned off as indicated by Vo and pressure is supplied to the ball clamp and to the rod clamp as indicated by P+ to release the ball and rod. The pre-adjusted plate Y is then moved down into engagement with the head 21 until the plate engages the work engaging projections 23 on the head and tilts the head to extend parallel to the plate. In a second step, vacuum to the vacuum cup is turned on as indicated by V- in FIG. 11 to attach the work engaging head to the plate Y and pressure to the ball clamp 31 is turned off as indicated by Po to lock the head in adjusted position relative to the rod 32. The plate is then moved upwardly or downwardly as shown in FIG. 12 to raise or lower the angularly adjusted head to the desired position above the base and pressure to the rod clamp is then turned off to lock the head in adjusted positions relative to the base. In the step shown in FIG. 13, the pressure supply to the rod clamp and the ball clamp is off and the vacuum to the head is turned off so that the adjusting plate Y can be separated from the head 21. This sequence of steps is continued for each work holder in the array and, after all of the work holders in the array are adjusted in the above manner to the desired angle and position with respect to the base corresponding to the work contour at the locus of the work holders, a workpiece designated WP can be lowered onto the work engaging head as shown in FIG. 14 and the vacuum to the vacuum cup then turned on as indicated in FIG. 15 to hold the workpiece in position on the adjusted work engaging head.

Alternatively, if a workpiece or model of the workpiece is available, an array of the work holders can also be adjusted to conform to the contour of a workpiece or model by (1) positioning a workpiece of the desired contour over an array of the work holders, (2) raising the work engaging heads using means such as springs or fluid pressure to raise the rods 32 while fluid pressure to the rod clamp and ball clamp for each work holder is turned on to unclamp the ball and rod; (3) turning the vacuum to the vacuum heads on after the heads contact and conform to the workpiece and (4) thereafter turning off pressure to the rod clamps and ball clamps to lock the heads in adjusted position while the vacuum to the vacuum cups is maintained on to hold the workpiece on the heads.

The embodiments of the invention in which an exclusive property or privilege is claimed are defined as follows:

1. In a lockable ball joint apparatus including a ball and casing means having a ball receiving cavity, the improvement comprising: at least one annular clamp ring in the casing means extending around the ball, the clamp ring having a spherically concave inner clamping surface engaging an outer surface of the ball and a frusto-conical outer surface, annular cam means in the casing means extending around the clamp ring and having a frusto-conical inner surface engaging the frusto-conical outer surface of the clamp ring, means for moving the annular cam means axially in a first direction relative to the casing means to diametrically compress the clamp ring into clamping engagement with the ball, and means for moving the annular cam means axially in a second direction relative to the casing means to release the clamp ring from clamping engagement with the ball.

2. Apparatus according to claim 1 wherein the inner surface of the clamp ring has a larger internal diameter at one end than at an opposite end and said outer surface of said clamp ring has a larger outer diameter at said one end than at said opposite end.

3. An apparatus according to claim 2 wherein said one end of the clamp ring is disposed at one side of a plane through a center of the ball.

4. An apparatus according to claim 3 wherein said casing means includes means defining a spherically concave inner surface engaging the ball in opposed relation to the spherically concave inner surface on the clamp ring.

5. An apparatus according to claim 1 wherein one said means for moving the cam means includes an annular piston means rigid with said annular cam means and slidable in said casing means, and means for supplying fluid under pressure to said annular piston means for moving the annular cam means in said second direction.

6. An apparatus according to claim 5 wherein the other of said means for moving the cam means includes spring means engaging said casing means and said annular piston means for yieldably urging the annular cam means in said first direction, said piston means being operable to move the annular cam means in said second direction.

7. An apparatus according to claim 1 wherein one said means for moving the cam means includes an annular piston means rigid with said annular cam means and slidable in said casing means, and means for supplying fluid under pressure to said annular piston means for moving the annular cam means in one of said directions.

8. An apparatus according to claim 7 wherein the other of said means for moving the cam means includes spring means engaging said casing means and said annular piston means.

9. An apparatus according to claim 8 wherein the annular cam means is formed on an inner surface of the annular piston means.

10. In a lockable ball joint apparatus comprising, a ball and casing means having a ball receiving cavity, first and second annular clamp rings in the casing means extending around the ball, the first and second clamp rings each having a spherically concave inner clamping surface engaging the ball at opposite sides of a plane through a center of the ball, the clamp rings each having a frusto-conical outer surface; first and second annular cam means in the casing means and each having a frusto-conical inner surface respectively extending around the outer surface of the first and second clamp rings; means for moving the first and second cam means axially in directions to radially compress the respective first and second clamp rings, and means for moving the first and second annular cam means in directions to release the respective first and second clamp rings.

11. An apparatus according to claim 10 wherein the frusto-conical outer surfaces on the clamp rings taper inwardly in a direction away from a plane through the center of the ball.

12. An apparatus according to claim 10 wherein the means for moving the first and second annular cam means includes first and second annular pistons respectively rigid with the first and second annular cam means.

13. An apparatus according to claim 12 wherein spring means are provided for normally moving the first and second annular cam means in directions to compress the first and second clamp rings, and means for applying fluid under pressure to said first and second piston means for moving the first and second annular cam means to a release condition.

14. An apparatus according to claim 10 including a seal ring means extending around the ball between the first and second clamp rings, the means for moving the first and second annular cam means including first and second annular pistons respectively rigid with the first and second cam means and each having a portion in sealing engagement with said seal ring means.

15. An apparatus according to claim 14 wherein the frusto-conical outer surfaces of the clamp rings taper inwardly in a direction away from the seal ring.

* * * * *